(12) United States Patent
Nakamura et al.

(10) Patent No.: US 11,172,103 B2
(45) Date of Patent: Nov. 9, 2021

(54) HEAT-RESISTANT IMAGING CAMERA THAT MOVES IN A HIGH TEMPERATURE FURNACE

(71) Applicant: Hitachi Kokusai Electric Inc., Tokyo (JP)

(72) Inventors: Keigo Nakamura, Tokyo (JP); Takahiro Daikoku, Tokyo (JP); Takeshi Kashiyama, Shizuoka (JP); Yoshiyuki Murano, Shizuoka (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 17/005,228

(22) Filed: Aug. 27, 2020

(65) Prior Publication Data

US 2021/0075938 A1 Mar. 11, 2021

(30) Foreign Application Priority Data

Sep. 6, 2019 (JP) .............................. JP2019-162682

(51) Int. Cl.
*H04N 5/225* (2006.01)
*G01K 7/08* (2006.01)

(52) U.S. Cl.
CPC .............. *H04N 5/2252* (2013.01); *G01K 7/08* (2013.01); *H04N 5/2253* (2013.01)

(58) Field of Classification Search
CPC ............... H04N 5/2252; H04N 5/2253; H04N 5/22521; H04N 2005/2255; G01K 7/08
See application file for complete search history.

(56) References Cited

U.S. PATENT DOCUMENTS

| | | | | |
|---|---|---|---|---|
| 6,239,831 | B1* | 5/2001 | Eversole | H04N 5/2252 |
| | | | | 348/143 |
| 10,107,688 | B2* | 10/2018 | Kim | G01J 5/04 |
| 2010/0110175 | A1* | 5/2010 | Kolek | F27B 9/40 |
| | | | | 348/135 |
| 2015/0159924 | A1* | 6/2015 | Calderon | F25D 11/006 |
| | | | | 62/3.6 |
| 2017/0268376 | A1* | 9/2017 | Bailey | F01D 25/24 |
| 2018/0231875 | A1* | 8/2018 | Zanganeh | H04N 5/2252 |

FOREIGN PATENT DOCUMENTS

| | | | |
|---|---|---|---|
| CN | 206237507 | * | 6/2017 |
| JP | S58-035397 B | | 8/1983 |

* cited by examiner

*Primary Examiner* — Padma Haliyur
(74) *Attorney, Agent, or Firm* — Myers Wolin, LLC

(57) ABSTRACT

Provided is a heat-resistant imaging camera configured to move in a high temperature furnace and configured to capture high-definition images of the outer side or the inner side of a painted object passing in a high temperature drying furnace. Heat insulators (13a to 13f) are attached to all inner surfaces of an outer case (10) of a heat-resistant imaging camera (1) except a double glass window (21), and cold storage material packs (15a to 15e) are disposed inward of the heat insulators (13a to 13f) in layers so as to cover around a camera (2). Intrusive heat is absorbed by melting latent heat when the cold storage material packs (15a to 15e) are melted and changed in phase from a solid to a liquid at a specific temperature or higher, thereby ensuring heat resistance that maintains the camera (2) at a safely operatable temperature.

5 Claims, 8 Drawing Sheets

HEAT-RESISTANT IMAGING CAMERA THAT MOVES IN A HIGH TEMPERATURE FURNACE

CROSS REFERENCE TO RELATED APPLICATION

This application claims priority under 35 U.S.C. 119 from Japanese Patent Application No. 2019-162682, filed on Sep. 6, 2019, the contents of which are incorporated by reference herein.

Field of the Invention

The present invention relates to a heat-resistant imaging camera for observing the behavior of a painted object passing in a high temperature drying furnace. In particular, the present invention relates to a heat-resistant imaging camera that continues to capture images while moving in a high temperature drying furnace from its normal temperature inlet to its normal temperature outlet, thereby continuously observing, while moving along with a painted object passing in the high temperature furnace, the behavior of a paint that flows and cures due to a temperature rise of the painted object, passing of the painted object in a high temperature field for a certain time, and a temperature drop of the painted object.

DESCRIPTION OF THE RELATED ART

Related Art

Usually, for consecutively drying objects coated with a paint, a method is widely employed industrially that passes the painted objects through a high temperature region in a paint drying furnace.

When the painted object is mounted on a moving device and moves from a normal temperature inlet, passing through the drying high temperature region, toward a normal temperature outlet, the paint of the painted object tends to flow due to a temperature rise, resulting in the occurrence of dripping of the paint, variation in the thickness of the paint, or the like.

In addition, the thermal deformation of the painted object occurs due to a temperature rise and a temperature drop on the painted object so that the behavior of the paint becomes further complicated.

Therefore, a method is usually used that observes an in-furnace moving object by providing an observation window in an outer wall of a high temperature drying furnace.

On the other hand, Patent Literature 1 (Japanese Examined Patent Publication No. 58-35397) discloses a cooling device for an electronic device mounted on a moving device, wherein, as an automatic inspection device that moves in a high temperature field inside a reactor containment vessel, a means is proposed that patrols a predetermined inspection route by a monorail or the like.

Further, the automatic inspection device is configured such that a television camera housed in a cooling case is connected to the outside of the vessel through a cable, thus receiving a power supply from the outside and transmitting captured television camera images to the outside through a signal transmission cable.

RELATED ART LITERATURE

Patent Literatures

[Patent Literature 1] Japanese Examined Patent Publication No. 58-35397

However, with the conventional method of observing the in-furnace moving object by providing the observation window in the outer wall of the high temperature drying furnace, there has been a problem that since only the range visible from the observation window or only the outer side of the moving object can be observed, it is difficult, in particular, to image a place distant from the observation window or image the moving object in high definition through the stationary window.

With the method described in Patent Literature 1, there has been a problem that, in view of the heat resistance of the cable, the temperature of the usable high temperature field is relatively low, and therefore the environment in which the automatic inspection device can be used is limited.

In a belt conveyor type soldering heating furnace, a short circuit of a portion to be soldered occurs at times when melting a solder and connecting an electronic component mounted on a board to a connection circuit of the board by soldering. However, there is no means to constantly observe a soldering portion of the board that is moving being placed on a belt conveyor.

SUMMARY OF THE INVENTION

The present invention has been made in view of these circumstances, and it is an object of the present invention to provide a heat-resistant imaging camera that is mounted, along with a painted object, on a moving device configured to move in a high temperature drying furnace reaching a high temperature of, for example, 200° C., and that has a heat resistance capable of constantly and continuously capturing non-blurred high-definition images of unsteady state behavior of the moving painted object, that is in a state of being subjected to temperature variation, from either the outer side or the inner side of the moving painted object.

Further, it is an object of the present invention to provide an autonomous heat-resistant imaging camera having the operability of being handled freely without being subjected to the limitation of installation location by a reduction in size and weight, the autonomy of continuously capturing images and continuously recording the captured images without receiving any power supply from the outside, and the functionality of lighting a moving painted object.

The present invention for solving the above-described conventional problems is a heat-resistant imaging camera configured to image a moving object passing in a high temperature furnace, the heat-resistant imaging camera including: a camera part for imaging; a housing inner case housing the camera part; and an outer case of a heat-resistant imaging camera housing the housing inner case, wherein: the outer case of a heat-resistant imaging camera is configured such that a heat insulator is attached to an inner wall surface of the outer case except a glass window configured to allow the camera part to image an outside; and a cold storage material is disposed between the heat insulator and the housing inner case, the cold storage material configured to be melted and changed in phase from a solid to a liquid at a specific temperature or higher to absorb intrusive heat by melting latent heat. Consequently, there is an effect that the heat that enters the inside of the heat-resistant imaging camera through the heat insulator can be absorbed by the melting latent heat of the cold storage material so that the temperature rise inside the heat-resistant imaging camera can be suppressed to be small until the melting latent heat is used up.

The heat-resistant imaging camera according to the present invention further includes: an internal battery configured to supply electric power in the heat-resistant imaging camera; a memory configured to record an image captured while the heat-resistant imaging camera is moving; and LED lighting semiconductors arranged in a ring shape around an imaging lens of the camera part. With this configuration, the LED lighting semiconductors excellent in power saving are arranged in the ring shape around the imaging lens so that it is possible to light the imaging object evenly even in a dark space inside the high temperature furnace. Consequently, there is an effect that it is possible to enhance the autonomy of the operation of the heat-resistant imaging camera, such as not receiving any help from the outside and being free of the limitation of a usable environment, and further to enhance the heat resistance performance of the heat-resistant imaging camera, so that it is possible to simultaneously achieve both of them.

In the heat-resistant imaging camera according to the present invention, the outer case of a heat-resistant imaging camera is configured such that the heat insulator is stuck to the inner wall surface of the outer case except the glass window configured to allow the camera part to image the outside; and the housing inner case of a heat-resistant imaging camera is configured such that cold storage material packs serving as the cold storage material are fixed by fixing metal fittings to five surfaces of the outer walls of the housing inner case except a side wall configured to allow the camera part to image the outside, the cold storage material packs each configured to be melted and changed in phase from a solid to a liquid at the specific temperature or higher to absorb intrusive heat by melting latent heat.

The present invention is a method of manufacturing the heat-resistant imaging camera, wherein the method includes: after the cold storage material packs are warmed to a melting point or higher to be softened and are housed in the fixing metal fittings, fixing the cold storage material packs by the fixing metal fittings to the outer wall surfaces of the housing inner case except the side wall configured to allow the camera part to image the outside; and inserting the housing inner case fixed with the cold storage material packs into an internal space of the outer case stuck with the heat insulator, to perform assembly. Consequently, there is an effect that the assembly of the heat-resistant imaging camera is facilitated and simultaneously that the paths for the entry of heat from the outside can be reduced to enhance the heat resistance performance of the heat-resistant imaging camera.

DESCRIPTION OF REFERENCE NUMERALS

Figure 1:
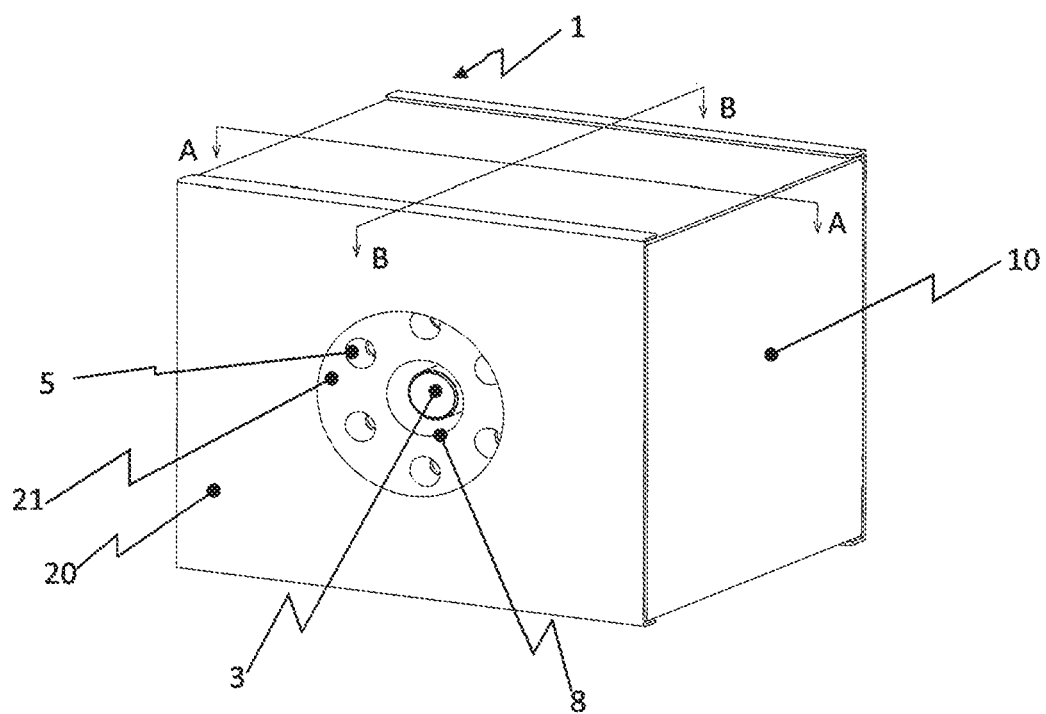
FIG. 1 is a perspective view in which a heat-resistant imaging camera that moves in a high temperature furnace according to a first embodiment of the present invention is viewed from the front obliquely above.

1, 100 heat-resistant imaging camera that moves in a high temperature furnace; 2 camera (camera part); 3 camera lens; 4 LED lighting semiconductor; 5 lighting light transmission opening; 6 lithium-ion battery; 7 thermal-conductive sheet; 8 camera lens insertion opening; 10 outer case of a heat-resistant imaging camera; 11, 110 housing inner case of a heat-resistant imaging camera; 12$a$ to 12$e$, 120$a$ to 120$e$ inner case constituent wall plates of a heat-resistant imaging camera; 121, 122 step; 13$a$ to 13$f$ heat insulators; 14$a$ to 14$e$, 140$a$ to 140$e$ fixing metal fittings; 15$a$ to 15$e$ cold storage material packs; 20 front door of a heat-resistant imaging camera; 21 double glass window; 160$c$, 160$d$ lug of a fixing metal fitting; 170$c$, 170$d$ fixing opening; 180$c$, 180$d$ insertion flange

DESCRIPTION OF THE PREFERRED EMBODIMENT

Embodiments of the present invention will be described with reference to the drawings.

Outline of Embodiments

A heat-resistant imaging camera according to the embodiment of the present invention (the present camera) is a heat-resistant imaging camera that moves in a high temperature furnace. Heat insulators are attached to all inner surfaces of an outer case of the heat-resistant imaging camera except a double glass window through which a housed camera images the outside, and further, cold storage material packs that are melted and changed in phase from a solid to a liquid at a specific temperature or higher to absorb the intrusive heat by the melting latent heat are disposed inward of the heat insulators in layers so as to cover around the housed camera. Consequently, it is possible to provide heat resistance that enables capturing images in a stable temperature atmosphere until the housed camera ends the movement in the high temperature furnace.

Further, the present camera is configured as follows. When moving in the high temperature furnace, electric power is supplied from a battery housed inside so that there is need for a communication cable or a power supply cable connected to the outside, and a memory is included for recording images captured while moving in the high temperature furnace. Consequently, it is possible to provide the autonomy of the operation of the heat-resistant imaging camera being free of the limitation of a usable environment.

Further, the present camera is configured as follows. In order to enable capturing images even in a dark space inside the high temperature furnace, LED lighting semiconductors excellent in power saving are arranged in a ring shape around an imaging lens so as to make it possible to light an imaging object evenly.

Further, a manufacturing method of the present camera is configured as follows. Cold storage material packs that are melted and changed in phase from a solid to a liquid at a specific temperature or higher to absorb the intrusive heat by the melting latent heat are warmed to a melting point or higher to be softened and then are housed in fixing metal fittings in such a way as to match the shapes inside the fixing metal fittings. Then, the cold storage material packs are respectively fixed to a ceiling wall, a floor wall, left and right side walls, and a rear wall of the outer walls of a housing inner case of the heat-resistant imaging camera by the fixing metal fittings so that the housing inner case and the cold storage material packs are integrated with each other. Thereafter, the integrated housing inner case is inserted into an internal space formed by sticking heat insulators to inner surfaces of an outer case of the heat-resistant imaging camera except a double glass window. Consequently, the manufacturing technique that facilitates the assembly of the heat-resistant imaging camera is provided, and at the same time, the heat resistance that suppresses the entry of heat from an outside high temperature field is ensured by simplifying the configuration of the outer case and the housing inner case of the heat-resistant imaging camera.

First Embodiment

Figure 2:
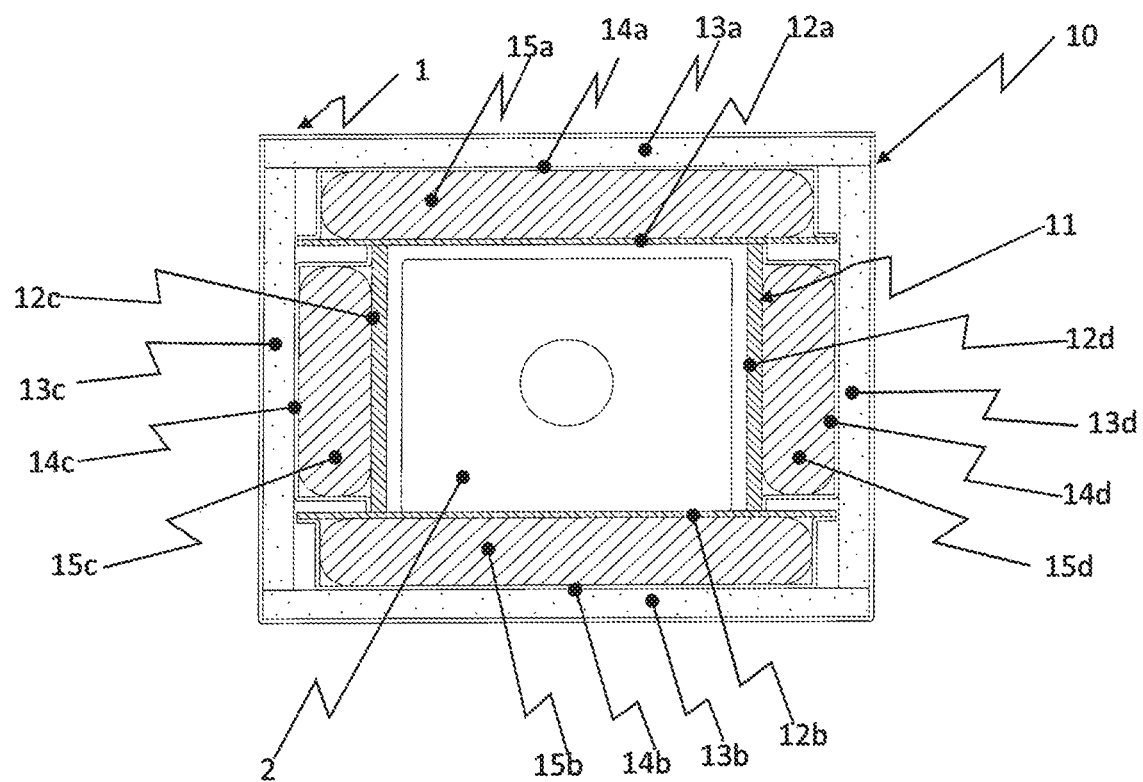
FIG. 2 is a diagram illustrating a section taken parallel to the front of the heat-resistant imaging camera that moves in the high temperature furnace according to the first embodiment of the present invention.
Figure 3:
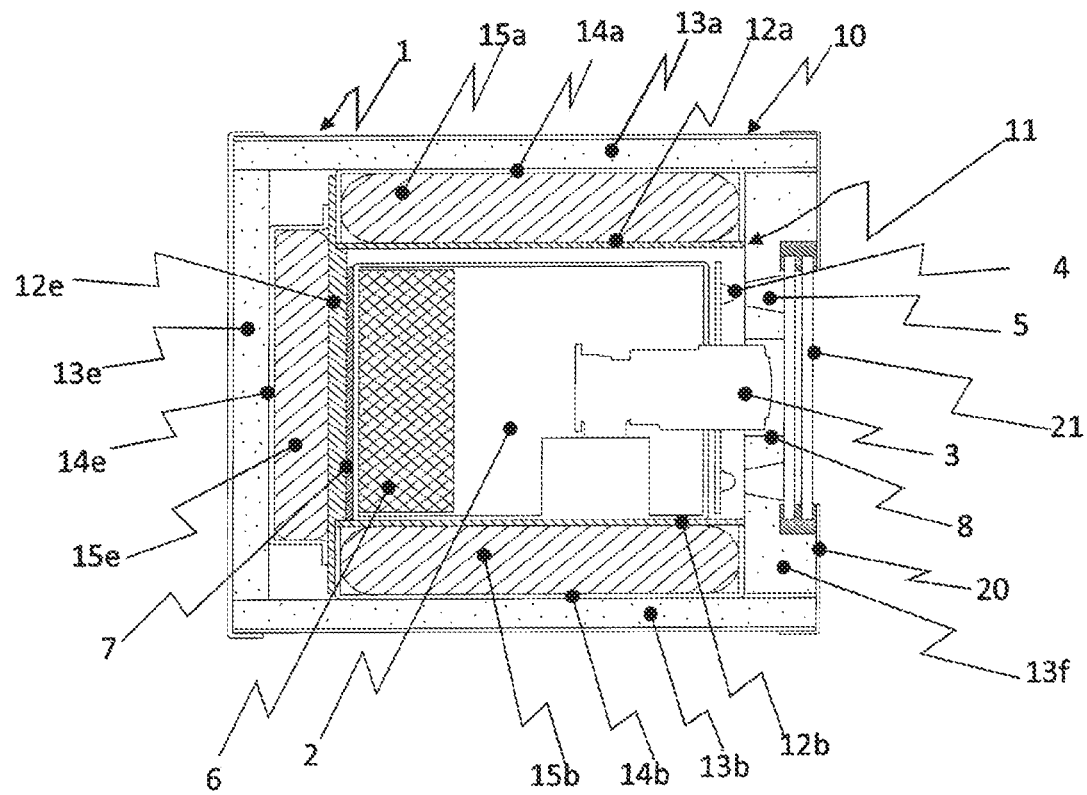
FIG. 3 is a diagram illustrating a section taken parallel to the side of the heat-resistant imaging camera that moves in the high temperature furnace according to the first embodiment of the present invention.
Figure 4:
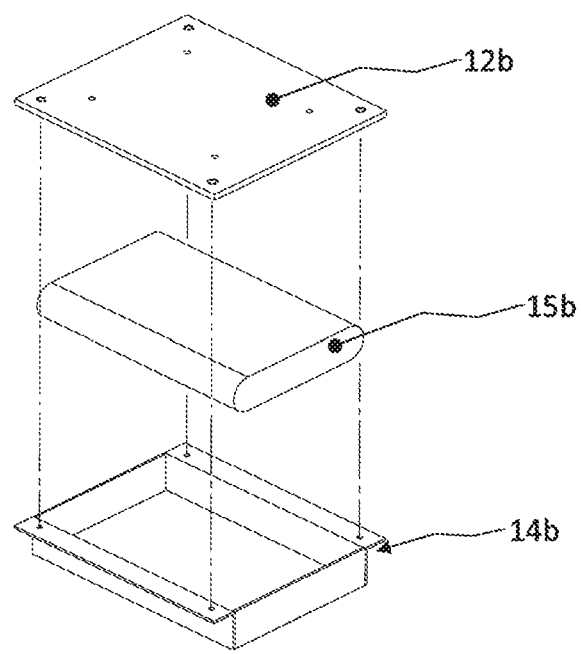
FIG. 4 is an exploded perspective view illustrating an assembly process of housing a cold storage material pack in a fixing metal fitting according to the first embodiment of the present invention.
Figure 5:
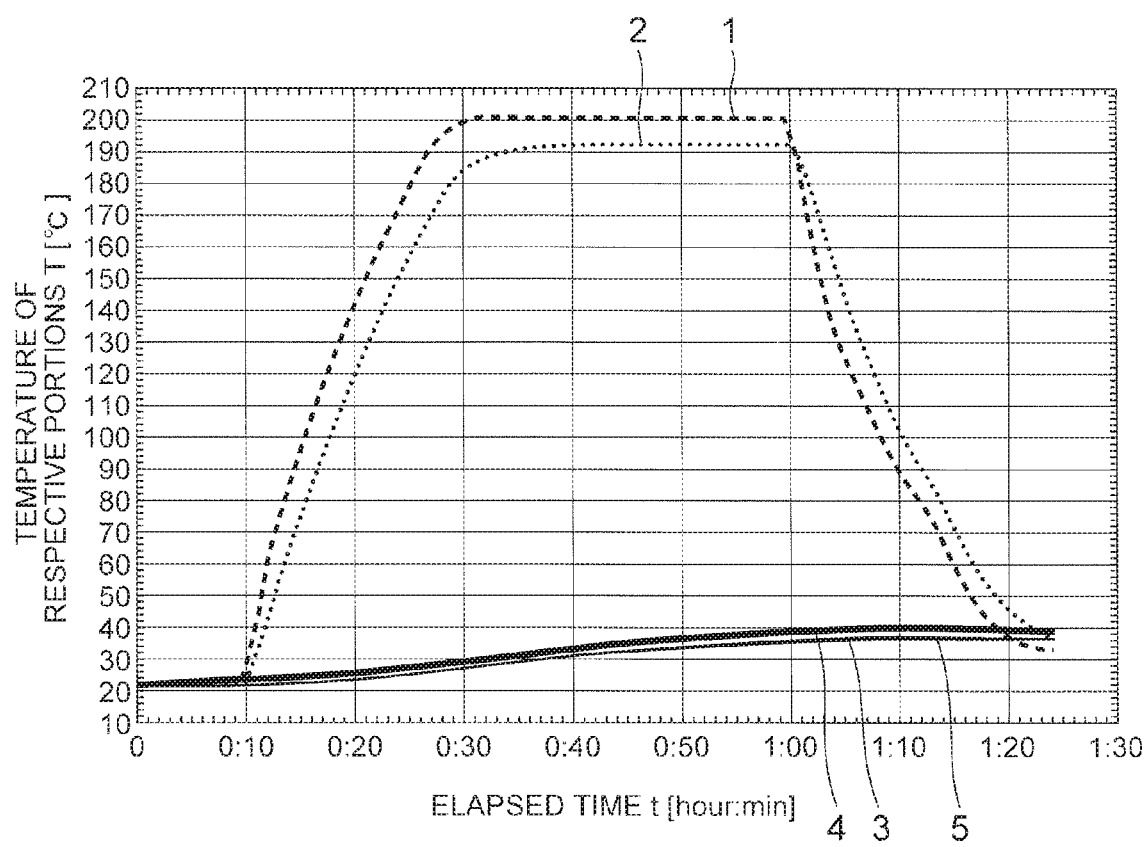
FIG. 5 is a diagram illustrating the results of producing, by way of trial, the heat-resistant imaging camera that moves in the high temperature furnace according to the first embodiment of the present invention, and performing a heat resistance temperature evaluation test.

Hereinafter, a heat-resistant imaging camera that moves in a high temperature furnace according to a first embodiment of the present invention will be described with reference to FIGS. 1 to 4. FIG. 1 is a perspective view in which the front of the heat-resistant imaging camera that moves in the high temperature furnace according to the first embodiment of the present invention is viewed from the front obliquely above. FIG. 2 is a sectional view taken transversely along the line A-A indicated in the perspective view of FIG. 1 and is an explanatory diagram illustrating a state in which heat insulators and cold storage material packs are attached to ceiling and floor wall surfaces and left and right side wall surfaces of the outer wall inner surfaces of the heat-resistant imaging camera that moves in the high temperature furnace. FIG. 3 is a sectional view taken longitudinally along the line B-B indicated in the perspective view of FIG. 1 and is an explanatory diagram illustrating a state in which heat insulators and cold storage material packs are attached to the ceiling and floor wall surfaces and a rear wall surface of the outer wall inner surfaces of the heat-resistant imaging camera that moves in the high temperature furnace, and further illustrating a configuration of attaching a camera lens, a double glass window, LED lighting semiconductors, and so on when imaging the outside by the heat-resistant imaging camera. FIG. 4 is an exploded perspective view for explaining an assembly method of attaching the cold storage material pack to an inner case wall of the heat-resistant imaging camera that moves in the high temperature furnace. FIG. 5 is a diagram illustrating the results of producing, by way of trial, the heat-resistant imaging camera that moves in the high temperature furnace, and performing a heat resistance temperature evaluation test.

[Configuration of Heat-Resistant Imaging Camera]

In a heat-resistant imaging camera 1 that moves in the high temperature furnace according to the first embodiment of the present invention, as illustrated in FIGS. 1 to 3, a double glass window 21 excellent in heat insulation performance is provided in a front door 20 of an outer case 10 so as to allow a camera 2 (corresponding to a "camera part" in the claims) to image the outside.

In order to ensure the heat insulation performance of the heat-resistant imaging camera 1 that moves in the high temperature furnace, heat insulators 13a to 13f are respectively attached to all wall surfaces of the inner wall surfaces of the outer case 10 of the heat-resistant imaging camera 1 except the double glass window 21.

Further, in order to absorb the heat that enters through the heat insulators 13a to 13f, cold storage material packs 15a to 15e respectively housed in internal spaces of fixing metal fittings 14a to 14e are respectively fixed to a ceiling plate 12a, a floor plate 12b, left and right side plates 12c, 12d, and a rear plate 12e of the constituent wall plates of a housing inner case 11 for the camera 2 by the fixing metal fittings 14a to 14e.

The cold storage material packs 15a to 15e are each a solid at normal temperature, but are liquefied when the temperature rises to be equal to or higher than a melting point of the cold storage material. Therefore, the cold storage material packs 15a to 15e absorb the intrusive heat by the melting latent heat of the cold storage material in the course of the melting so as to suppress a temperature rise in the housing inner case 11 for the camera 2 to ensure the operation of the camera 2 until the heat-resistant imaging camera 1 completes the movement in the high temperature furnace.

The housing inner case 11 for the camera 2, fixed with the cold storage material packs 15a to 15e, is entirely disposed in a space surrounded by the heat insulators 13a to 13f of the outer case 10 of the heat-resistant imaging camera 1.

Consequently, a heat-resistant wall of the heat-resistant imaging camera 1, composed of the heat insulators 13a to 13e and the cold storage material packs 15a to 15e, is formed between the outer case 10 of the heat-resistant imaging camera 1 and the housing inner case 11 for the camera 2.

On the other hand, the heat insulator 13f is attached also to an inner wall of the front door 20 of the outer case 10 except the double glass window 21 that is excellent in heat insulation performance.

Further, LED (Light Emitting Diode) lighting semiconductors 4 are arranged in a ring shape around a camera lens 3, and lighting light transmission openings 5 for allowing the lighting light to pass through are provided in the heat insulator 13f on a back surface of the double glass window 21 in a region that does not block the field of view of the camera lens 3.

The camera 2 is disposed in the housing inner case 11, and the front end of the camera lens 3 is inserted in a camera lens insertion opening 8 formed in the heat insulator 13f.

Further, a lithium-ion battery 6 for supplying electric power is disposed in the innermost part of the housing inner case 11 being a place that is the most distant from the double glass window 21 in the housing inner case 11, and is in contact with the innermost wall of the housing inner case 11 via a thermal-conductive sheet 7. This is for placing the lithium-ion battery 6 in the place where the entry of heat is small and the ambient temperature is relatively low, thereby safely using the lithium-ion battery 6 at 60° C. or less.

[Assembly Manufacturing Method of Heat-Resistant Imaging Camera]

An assembly manufacturing method of the heat-resistant imaging camera 1 that moves in the high temperature furnace according to the first embodiment of the present invention will be described with reference to FIGS. 2 to 4.

The housing inner case 11 for the camera 2 is formed into a box shape by fastening together the ceiling plate 12a, the floor plate 12b, the left and right side plates 12c, 12d, and the rear plate 12e of the constituent wall plates by screws.

Thereafter, for example, as illustrated in the exploded perspective view of FIG. 4, the cold storage material pack 15b is housed in the fixing metal fitting 14b and then fixed to the floor plate 12b by the fixing metal fitting 14b. In this way, all the cold storage material packs 15a to 15e need to be housed in the internal spaces of the fixing metal fittings 14a to 14e, respectively.

However, since the cold storage material packs 15a to 15e are each solidified to a solid when the temperature becomes less than the melting point even while being stored at room temperature, it is very difficult to house the solidified cold storage material packs 15a to 15e in such a way as to match the shapes of the internal spaces of the fixing metal fittings 14a to 14e, and if the solidified cold storage material packs 15a to 15e are forced into the internal spaces of the fixing metal fittings 14a to 14e, the aluminum foil packs are broken.

Therefore, the cold storage material packs 15a to 15e are warmed to a temperature equal to or higher than the melting point so as to be liquefied. The liquefied cold storage material packs 15a to 15e can freely change their shapes and thus can be housed so as to be in conformity with the shapes of the internal spaces of the fixing metal fittings 14a to 14e.

Thereafter, the fixing metal fittings 14a to 14e housing the cold storage material packs 15a to 15e are respectively fixed to the constituent wall plates 12a to 12e of the housing inner case 11 so that the cold storage material packs 15a to 15e can be integrated with the housing inner case 11.

In this event, since the cold storage material packs 15a to 15e are respectively sandwiched between the fixing metal fittings 14a to 14e and the constituent wall plates 12a to 12e even being liquefied and softened, the handling thereafter is facilitated.

Unless integrated, even when the cold storage material packs 15a to 15e are lowered in temperature to be solidified, there is a possibility of being detached from the fixing metal fittings 14a to 14e or the like so that the assembly cannot be easily performed.

Then, after integrating the cold storage material packs 15a to 15e with the housing inner case 11, the entirety of the housing inner case 11 is disposed in the space surrounded by the heat insulators 13a to 13f of the outer case 10 of the heat-resistant imaging camera 1. Consequently, the heat-resistant wall of the heat-resistant imaging camera 1, composed of the heat insulators 13a to 13e and the cold storage material packs 15a to 15e disposed in layers, can be easily formed between the outer case 10 of the heat-resistant imaging camera 1 and the housing inner case 11 for the camera 2.

[Heat Resistance Action of Heat-Resistant Imaging Camera]

The heat resistance action of the heat-resistant imaging camera 1 that moves in the high temperature furnace according to the first embodiment of the present invention will be described with reference to FIGS. 2 and 3.

When the heat-resistant imaging camera 1 that moves in the high temperature furnace moves into a high temperature drying furnace where the temperature rises to a high temperature of, for example, 200° C., the outer wall temperature of the outer case 10 of the heat-resistant imaging camera 1 rises to the high temperature.

However, since the temperature of the housing inner case 11 of the heat-resistant imaging camera 1 is still low, the heat that will enter the inside of the housing inner case 11 from the outside is transferred by heat conduction through the insides of the heat insulators 13a to 13f of the outer case 10 of the heat-resistant imaging camera 1 and then enters the cold storage material packs 15a to 15e.

When the temperature of the cold storage material packs 15a to 15e is less than the melting point, the temperature of the cold storage material packs 15a to 15e gradually rises according to the heat capacity of the cold storage material packs 15a to 15e in the solid state.

Then, as the intrusive heat from the heat insulators 13a to 13f increases, the temperature of the cold storage material packs 15a to 15e exceeds the melting point so that the cold storage material packs 15a to 15e start to be gradually melted and liquefied from portions where the intrusive heat enters.

In this event, the intrusive heat is absorbed by the melting latent heat of the cold storage material packs 15a to 15e so that the internal space temperature of the housing inner case 11 of the heat-resistant imaging camera 1 can be maintained at a low temperature at which the camera 2 can stably operate. Therefore, the time for the camera 2 to stably capture images can be ensured until the cold storage material packs 15a to 15e are completely melted.

On the other hand, the heat generation due to the operations of the camera 2, the LED lighting semiconductors 4, a memory for captured images, and so on by the power supply of the lithium-ion battery 6 is added, but the total heat generation amount of them is relatively small compared to the total heat absorption amount of the melting latent heat and the heat capacity of the cold storage material packs 15a to 15e. Therefore, until the cold storage material packs 15a to 15e are completely melted, the temperature rise is gentle so that the temperature in the housing inner case 11 of the heat-resistant imaging camera 1 can be maintained at a low temperature.

As described above, the heat-resistant imaging camera 1 that moves in the high temperature furnace can be maintained in a stably operatable temperature range and thus the heat resistance performance of the heat-resistant imaging camera 1 can be ensured by the intrusive heat absorption capability of the melting latent heat of the cold storage material packs 15a to 15e without using any cooling means from the outside.

In order to confirm the heat resistance effect described above, the heat-resistant imaging camera 1 was manufactured and a heat resistance evaluation test was performed. As the heat insulators 13a to 13f, use was made of, for example, product name: [Wacker WDS] WDS950, thickness: 10 mm, thermal conductivity: 0.021 W/mK (average temperature 200° C.), sold by Kurosaki Harima Corporation. As the cold storage material packs 15a to 15e, use was made of, for example, aluminum foil packs of product name: (PCM-C32), phase change temperature: 32° C., melting latent heat: 45 Wh/kg, sold by Nippon Blower Co., Ltd. The heat-resistant imaging camera 1 had a lateral width of 200 mm, a height of 170 mm, and a depth of 165 mm.

FIG. 5 illustrates the progress of the temperatures of the respective portions as the results of the test in which the heat-resistant imaging camera 1 manufactured with the specification described above was placed in a high temperature furnace, the temperature was raised from normal temperature to a high temperature of 200° C. in about 20 minutes, the high temperature of 200° C. was maintained for 30 minutes, and then the temperature was dropped to a normal-temperature level temperature in 20 minutes.

In this event, while performing the LED lighting, the camera 2 continued to capture HD (High Definition) images at 30 frames per second and record them. In this event, the camera devices received all power supply from the internal lithium-ion battery 6, and the total electric power consumed by the camera devices was 7.2 W.

In FIG. 5, respective temperature lines represent such that numeral 1 denotes the in-furnace average temperature, numeral 2 the outer wall average temperature of the heat-resistant imaging camera outer case 10, numeral 3 the inner wall average temperature of the heat-resistant imaging camera inner case 11, numeral 4 the average temperature of the camera ambient air, and numeral 5 the temperature of a cooling wall of the lithium-ion battery 6. Note that the curved line 3 and the curved line 5 almost coincide with each other.

As a result, it was confirmed that, even after passing in the high temperature state of 200° C. for 30 minutes, the camera ambient air average temperature (the curved line 4) was about 40° C. at most even including the residual heat effect of the members and thus was maintained at the temperature lower, by as much as 10° C., than an upper limit temperature of 50° C. at which the camera 2 can stably operate, and further the cooling wall temperature of the lithium-ion battery 6 (the curved line 5) was slightly lower than the camera ambient air average temperature (the curved line 4).

Second Embodiment

Hereinafter, a heat-resistant imaging camera that moves in a high temperature furnace according to a second embodiment of the present invention will be described with reference to FIGS. 6 to 8. The same reference symbols are given to the same constituent members as those of the first embodiment, and a description thereof is omitted.

Figure 6:
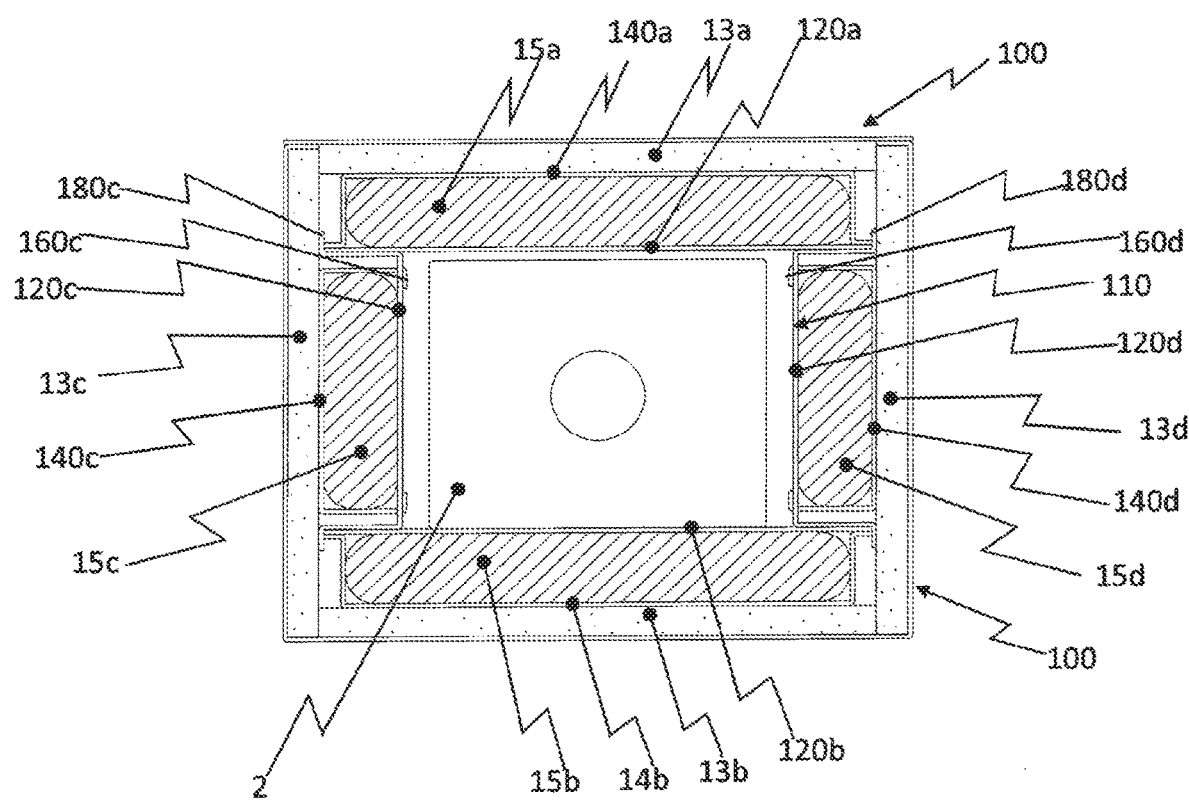
FIG. 6 is a diagram illustrating a section taken parallel to the front of a heat-resistant imaging camera that moves in a high temperature furnace according to a second embodiment of the present invention.

FIG. 6 is a sectional view taken transversely and is an explanatory diagram illustrating a state in which heat insulators and cold storage material packs are attached to ceiling and floor wall surfaces and left and right side wall surfaces of the outer wall inner surfaces of the heat-resistant imaging camera that moves in the high temperature furnace. FIG. 7 is a sectional view taken longitudinally and is an explanatory diagram illustrating a state in which heat insulators and cold storage material packs are attached to the ceiling and floor wall surfaces and a rear wall surface of the outer wall inner surfaces of the heat-resistant imaging camera that moves in the high temperature furnace, and further illustrating a configuration of attaching a camera lens, a double glass window, LED lighting semiconductors, and so on when imaging the outside by the heat-resistant imaging camera. FIG. 8 is an exploded perspective view for explaining an assembly method of attaching the cold storage material pack to an inner case wall of the heat-resistant imaging camera that moves in the high temperature furnace.

[Configuration and Assembly Manufacturing Method of Heat-Resistant Imaging Camera]

Figure 7:
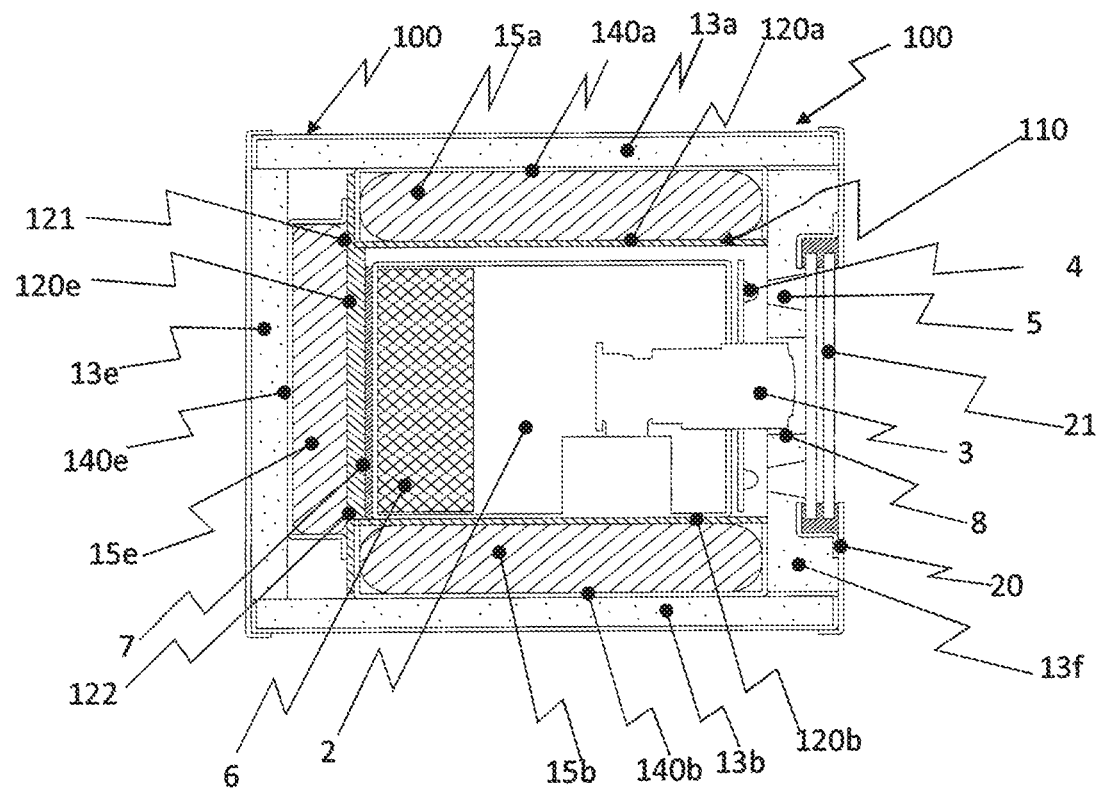
FIG. 7 is a diagram illustrating a section taken parallel to the side of the heat-resistant imaging camera that moves in the high temperature furnace according to the second embodiment of the present invention.
Figure 8:
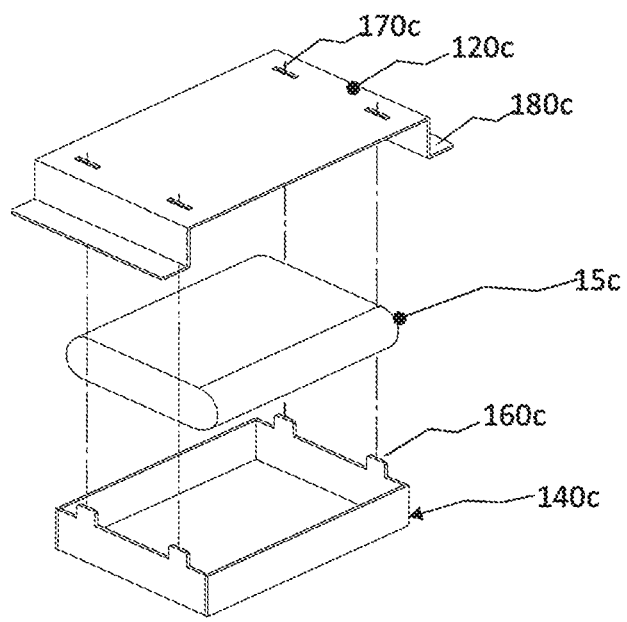
FIG. 8 is an exploded perspective view illustrating an assembly process of housing a cold storage material pack in a fixing metal fitting according to the second embodiment of the present invention.

In a heat-resistant imaging camera 100 that moves in the high temperature furnace according to the second embodiment of the present invention, as illustrated in FIGS. 6 to 8, at the left and right side walls, lugs 160c, 160d are provided at front ends of fixing metal fittings 140c, 140d housing the cold storage material packs 15c, 15d, and by inserting the lugs 160c, 160d through fixing openings 170c, 170d of constituent wall plates 120c, 120d of a housing inner case 110 and then bending the lugs 160c, 160d, the fixing metal fittings 140c, 140d are fixed to the fixing openings 170c, 170d.

The constituent wall plates 120c, 120d are each first bent into a ]-shape and then both front ends of the ]-shaped plate are further bent so that insertion flanges 180c, 180d are formed.

In this event, the lengths of portions bent to form the ]-shape are adjusted so as to be the heights of left and right side wall surfaces of the constituent wall plate. As illustrated in FIG. 6, the widths of a ceiling wall plate 120a and a floor wall plate 120b of the constituent wall plates of the housing inner case 110 are narrowed to form gaps with respect to the heat insulators 13c, 13d so that, by inserting the insertion flanges 180c, 180d through the gaps, the wall plates 120a to 120d of the housing inner case 110 can be fixed together.

With the method of fastening together the constituent wall plates 12a to 12e of the housing inner case 11 for the camera 2 by the screws as in the first embodiment, since screw holes are formed, the constituent wall plates 12c, 12d are thickened. On the other hand, with the configuration of the second embodiment, the need for screw fastening is eliminated. As illustrated in FIG. 6, since the constituent wall plates 120a to 120e of the housing inner case 110 can be fixed together only by mutually inserting the constituent wall plates 120a to 120e, there is an advantage that the thickness of the housing inner case 110 can be reduced.

As a result, the heat-resistant imaging camera 100 can be reduced in size and weight.

Further, since the cold storage material packs 15a to 15e can be independently mounted, each for a corresponding one of the constituent wall plates 120a to 120e, the productivity is further enhanced.

On the other hand, as illustrated in FIG. 7, the rear wall plate 120e of the constituent wall plates of the housing inner case 110 is provided with steps 121, 122 so as to match the inner width and the vertical height of the housing inner case 110. By inserting the steps 121, 122 into end face spaces of the housing inner case 110, the rear wall plate 120e of the housing inner case 110 can be fixed.

A method of housing the cold storage material packs 15a to 15e in internal spaces of the fixing metal fittings 140a to 140e is as follows. Like in the first embodiment of the present invention, the cold storage material packs 15a to 15e are warmed at a temperature equal to or higher than the melting point so that the cold storage material packs 15a to 15e are liquefied. As a result, the liquefied cold storage material packs 15a to 15e can freely change their shapes and thus can be housed so as to be in conformity with the shapes of the internal spaces of the fixing metal fittings 140a to 140e.

The heat resistance action of the heat-resistant imaging camera 100 that moves in the high temperature furnace according to the second embodiment of the present invention is the same as that of the first embodiment of the present invention, and therefore, a description thereof is omitted.

Effects of Embodiments

With the present camera, since the heat insulators 13a to 13f and the cold storage material packs 15a to 15e are disposed in layers to cover around the camera 2 housed inside the heat-resistant imaging camera 1 that moves in the high temperature furnace, there is an effect that the heat that enters the inside of the heat-resistant imaging camera 1 through the heat insulators 13a to 13f can be absorbed by the melting latent heat of the cold storage material packs 15a to 15e so that the temperature rise inside the heat-resistant imaging camera 1 can be suppressed to be small until the melting latent heat is used up.

With the present camera, since it is configured that bolts or the like for fixing the cold storage material packs 15a to 15e to the outer walls of the heat-resistant imaging camera 1 are eliminated, there is an effect that the entry of heat is small so that it is possible to further enhance the heat resistance performance of the heat-resistant imaging camera 1 that moves in the high temperature furnace.

With the present camera, the internal battery 6 for power supply and the memory for recording continuously captured images are incorporated in the heat-resistant imaging camera 1, and further, the LED lighting semiconductors 4 excellent in power saving are arranged in the ring shape around the imaging lens 3 so that it is possible to light an imaging object evenly even in a dark space inside the high temperature furnace. Consequently, there is an effect that it is possible to enhance the autonomy of the operation of the heat-resistant imaging camera 1, such as not receiving any help from the outside and being free of the limitation of a usable environment, and further to enhance the heat resistance performance of the heat-resistant imaging camera 1, so that it is possible to simultaneously achieve both of them.

Further, with the present camera, since the cold storage material packs 15a to 15e can be integrally fixed to the outer walls of the heat-resistant camera housing inner case 11, 110, there is an effect that the assembly of the heat-resistant imaging camera 1 is facilitated and simultaneously that the paths for the entry of heat from the outside can be reduced to enhance the heat resistance performance of the heat-resistant imaging camera 1.

The present camera can be reused over and over again by returning the temperature to normal temperature after the use to solidify the cold storage material packs 15a to 15e.

INDUSTRIAL APPLICABILITY

The present invention is suitable for a heat-resistant imaging camera that moves in a high temperature furnace, wherein the heat-resistant imaging camera continues to capture high-definition images of the outer side or the inner side of a painted object autonomously without receiving any help from the outside while moving along with the painted object passing in a high temperature drying furnace.

What is claimed is:

1. A heat-resistant imaging camera configured to move in the high temperature furnace, the heat-resistant imaging camera comprising:
    a camera part for imaging;
    a housing inner case housing the camera part; and
    an outer case housing the housing inner case,
    wherein:
    the outer case is configured such that a heat insulator is stuck to an; inner wall surface except glass window configured to allow the camera part to image an outside; and
    the housing inner case is configured such that cold storage material packs serving as the cold storage material are fixed by fixing metal fittings to five surfaces of outer walls except a side wall configured to allow the camera part to image the outside, the cold storage material packs each configured to be melted and changed in phase from a solid to a liquid at the specific temperature or higher to absorb intrusive heat by melting latent heat.

2. The heat-resistant imaging camera configured to move in the high temperature furnace according to claim 1, further comprising
    an internal battery configured to supply electric power in the heat-resistant imaging camera;
    a memory configured to record an image captured while the heat-resistant imaging camera is moving, and
    a plurality of LED lighting semiconductors arranged in a ring shape around an imaging lens of the camera part.

3. A method of manufacturing the heat-resistant imaging camera of claim 1 configured to move in the high temperature furnace, the method comprising:
    warming the cold storage material packs to a melting point or higher to be softened and housing the cold storage material packs in the fixing metal fittings;
    fixing the cold storage material packs by the fixing metal fittings to the outer wall surfaces of the housing inner case except the side wall configured to allow the camera part to image the outside; and
    inserting the housing inner case fixed with the cold storage material packs into an internal space of the outer case stuck with the heat insulator, to perform assembly.

4. A method of manufacturing the heat-resistant imaging camera of claim 2 configured to move in the high temperature furnace, the method comprising:
    warming the cold storage material packs to a melting point or higher to be softened and housing the cold storage material packs in the fixing metal fittings;
    fixing the cold storage material packs by the fixing metal fittings to the outer wall surfaces of the housing inner case except the side wall configured to allow the camera part to image the outside; and
    inserting the housing inner case fixed with the cold storage material packs into an internal space of the outer case stuck with the heat insulator, to perform assembly.

5. A heat-resistant imaging camera configured to move in the high temperature furnace, further comprising:
    an internal battery configured to supply electric power in the heat-resistant imaging camera;
    a memory configured to record an image captured while the heat-resistant imaging camera is moving; and
    a plurality of LED lighting semiconductors arranged in a ring shape around an imaging lens of the camera part, wherein:
    the outer case is configured such that the heat insulator is stuck to the inner wall surface except the glass window configured to allow the camera part to image the outside; and
    the housing inner case is configured such that cold storage material packs serving as the cold storage material are fixed by fixing metal fittings to five surfaces of outer walls except a side wall configured to allow the camera part to image the outside, the cold storage material packs each configured to be melted and changed in phase from a solid to a liquid at the specific temperature or higher to absorb intrusive heat by melting latent heat.

* * * * *